(12) United States Patent
Hazenbroek

(10) Patent No.: US 8,430,728 B2
(45) Date of Patent: Apr. 30, 2013

(54) SPECIAL CUT POULTRY WING CUTTER

(75) Inventor: Jacobus Eliza Hazenbroek, Oud-Beijerland (NL)

(73) Assignee: Foodmate BV, Oud-Beijerland (NL)

( * ) Notice: Subject to any disclaimer, the term of this patent is extended or adjusted under 35 U.S.C. 154(b) by 0 days.

(21) Appl. No.: 13/371,832

(22) Filed: Feb. 13, 2012

(65) Prior Publication Data
US 2012/0208443 A1    Aug. 16, 2012

Related U.S. Application Data

(60) Provisional application No. 61/442,409, filed on Feb. 14, 2011.

(51) Int. Cl.
*A22C 18/00* (2006.01)

(52) U.S. Cl.
USPC ........................................................ 452/169

(58) Field of Classification Search .................. 452/166, 452/169
See application file for complete search history.

(56) References Cited

U.S. PATENT DOCUMENTS

| | | | |
|---|---|---|---|
| 3,956,794 A | 5/1976 | Verbakel |
| 3,969,790 A | 7/1976 | Smorenburg |
| 3,979,793 A | 9/1976 | Hazenbroek |
| 3,983,601 A | 10/1976 | Verbakel |
| 3,990,128 A | 11/1976 | van Mil |
| 4,034,440 A | 7/1977 | van Mil |
| 4,118,829 A | 10/1978 | Harben, Jr. |
| 4,131,973 A | 1/1979 | Verbakel |
| 4,147,012 A | 4/1979 | van Mil |
| 4,153,971 A | 5/1979 | Simonds |
| 4,153,972 A | 5/1979 | Harben et al. |
| 4,178,659 A | 12/1979 | Simonds |
| 4,203,178 A | 5/1980 | Hazenbroek |
| 4,283,813 A | 8/1981 | House |
| 4,292,709 A | 10/1981 | van Mil |
| 4,388,811 A | 6/1983 | Zebarth |
| 4,395,795 A | 8/1983 | Hazenbroek |
| 4,406,037 A | 9/1983 | Hazenbroek |
| 4,418,444 A | 12/1983 | Meyn et al. |
| 4,418,445 A | 12/1983 | Meyn et al. |
| 4,434,526 A | 3/1984 | van Mil |
| 4,439,891 A | 4/1984 | van Mil |
| 4,468,838 A | 9/1984 | Sjöström et al. |

(Continued)

FOREIGN PATENT DOCUMENTS

| | | |
|---|---|---|
| EP | 0 786 208 A1 | 7/1997 |
| EP | 2 181 841 A1 | 5/2010 |

*Primary Examiner* — Richard Price, Jr.
(74) *Attorney, Agent, or Firm* — Womble Carlyle Sandridge & Rice, LLP (57) ABSTRACT

A poultry wing cutter is configured to receive poultry carcasses breast first, align the carcasses, and stretch the wings of the carcasses away from the body until the shoulder joints dislocate and separate. In the process, a portion of the breast meat is pulled outwardly with the wings and a pair of rotary knives slices off the wings. The blades begin their cuts part way into the breast meat of the bird so that a piece of breast meat remains attached to the severed wings to form a "new style" or "silver dollar" or "fast food style" wing depending upon how the wing cutter is adjusted. Feeding the birds breast first through the wing cutter results in wings with a consistent cut and weight from wing-to-wing, which is desired by consumers. Thus, the resulting wings are more in demand and therefore more valuable.

31 Claims, 8 Drawing Sheets

U.S. PATENT DOCUMENTS

| | | | |
|---|---|---|---|
| 4,510,886 A | 4/1985 | van Mil | |
| 4,514,879 A | 5/1985 | Hazenbroek | |
| 4,516,290 A | 5/1985 | van Mil | |
| 4,524,489 A | 6/1985 | van Mil | |
| 4,558,490 A | 12/1985 | Hazenbroek et al. | |
| 4,559,672 A | 12/1985 | Hazenbroek et al. | |
| 4,567,624 A | 2/1986 | van Mil | |
| 4,570,295 A | 2/1986 | van Mil | |
| 4,574,429 A | 3/1986 | Hazenbroek | |
| 4,577,368 A | 3/1986 | Hazenbroek | |
| D283,289 S | 4/1986 | Hazenbroek | |
| 4,593,432 A | 6/1986 | Hazenbroek | |
| 4,597,133 A | 7/1986 | van den Nieuwelaar | |
| 4,597,136 A | 7/1986 | Hazenbroek | |
| 4,635,317 A | 1/1987 | van der Eerden | |
| 4,639,973 A | 2/1987 | van der Eerden | |
| 4,639,974 A | 2/1987 | Olson | |
| 4,639,975 A | 2/1987 | van der Eerden | |
| 4,646,384 A | 3/1987 | van der Eerden | |
| 4,651,383 A | 3/1987 | van der Eerden | |
| 4,653,147 A | 3/1987 | van der Eerden | |
| 4,682,386 A | 7/1987 | Hazenbroek et al. | |
| 4,704,768 A | 11/1987 | Hutting et al. | |
| 4,723,339 A | 2/1988 | van den Nieuwelaar et al. | |
| 4,724,581 A | 2/1988 | van den Nieuwelaar | |
| 4,736,492 A | 4/1988 | Hazenbroek | |
| RE32,697 E | 6/1988 | Hazenbroek et al. | |
| 4,765,028 A | 8/1988 | van den Nieuwelaar et al. | |
| 4,766,644 A | 8/1988 | van den Nieuwelaar et al. | |
| 4,769,872 A | 9/1988 | Hazenbroek et al. | |
| 4,779,308 A | 10/1988 | van den Nieuwelaar et al. | |
| 4,788,749 A | 12/1988 | Hazenbroek et al. | |
| 4,811,456 A | 3/1989 | Heuvel | |
| 4,811,458 A | 3/1989 | v.d. Nieuwelaar et al. | |
| 4,811,462 A | 3/1989 | Meyn | |
| 4,813,101 A | 3/1989 | Brakels et al. | |
| 4,884,318 A | 12/1989 | Hazenbroek | |
| 4,893,378 A | 1/1990 | Hazenbroek | |
| 4,894,885 A | 1/1990 | Markert | |
| 4,896,399 A | 1/1990 | Hazenbroek | |
| 4,899,421 A | 2/1990 | Van Der Eerden | |
| 4,918,787 A | 4/1990 | Hazenbroek | |
| 4,928,351 A | 5/1990 | van den Nieuwelaar et al. | |
| 4,935,990 A | 6/1990 | Linnenbank | |
| 4,939,813 A | 7/1990 | Hazenbroek | |
| 4,958,694 A | 9/1990 | van den Nieuwelaar et al. | |
| 4,965,908 A | 10/1990 | Meyn | |
| 4,972,549 A | 11/1990 | van den Nieuwelaar et al. | |
| 4,993,113 A | 2/1991 | Hazenbroek | |
| 4,993,115 A | 2/1991 | Hazenbroek | |
| 5,001,812 A | 3/1991 | Hazenbroek | |
| 5,013,431 A | 5/1991 | Doets | |
| 5,015,213 A | 5/1991 | Hazenbroek | |
| 5,019,013 A | 5/1991 | Hazenbroek | |
| 5,026,983 A | 6/1991 | Meyn | |
| 5,035,673 A | 7/1991 | Hazenbroek | |
| 5,037,351 A | 8/1991 | van den Nieuwelaar et al. | |
| 5,041,054 A | 8/1991 | van den Nieuwelaar et al. | |
| 5,045,022 A | 9/1991 | Hazenbroek | |
| 5,060,596 A | 10/1991 | Esbroeck | |
| 5,064,402 A | 11/1991 | Koops | |
| 5,067,927 A | 11/1991 | Hazenbroek et al. | |
| 5,069,652 A | 12/1991 | Hazenbroek | |
| 5,074,823 A | 12/1991 | Meyn | |
| 5,088,959 A | 2/1992 | Heemskerk | |
| 5,090,940 A | 2/1992 | Adkison | |
| 5,098,333 A | 3/1992 | Cobb | |
| 5,104,351 A | 4/1992 | van den Nieuwelaar et al. | |
| 5,122,090 A | 6/1992 | van den Nieuwelaar et al. | |
| 5,123,871 A | 6/1992 | van den Nieuwelaar et al. | |
| 5,125,498 A | 6/1992 | Meyn | |
| 5,147,240 A | 9/1992 | Hazenbroek et al. | |
| 5,147,241 A | 9/1992 | Rudin | |
| 5,154,664 A | 10/1992 | Hazenbroek et al. | |
| 5,154,665 A | 10/1992 | Hazenbroek | |
| RE34,149 E | 12/1992 | Markert | |
| 5,173,076 A | 12/1992 | Hazenbroek | |
| 5,173,077 A | 12/1992 | van den Nieuwelaar et al. | |
| 5,176,563 A | 1/1993 | van den Nieuwelaar et al. | |
| 5,176,564 A | 1/1993 | Hazenbroek | |
| 5,178,890 A | 1/1993 | van den Nieuwelaar et al. | |
| 5,186,679 A | 2/1993 | Meyn | |
| 5,188,559 A | 2/1993 | Hazenbroek | |
| 5,188,560 A | 2/1993 | Hazenbroek | |
| 5,194,035 A | 3/1993 | Dillard | |
| 5,197,917 A | 3/1993 | Verbakel et al. | |
| 5,199,922 A | 4/1993 | Korenberg et al. | |
| 5,222,905 A | 6/1993 | Van den Nieuwelaar et al. | |
| 5,242,324 A | 9/1993 | Koops | |
| 5,248,277 A | 9/1993 | Bos et al. | |
| 5,256,101 A | 10/1993 | Koops | |
| 5,269,721 A | 12/1993 | Meyn | |
| 5,277,649 A | 1/1994 | Adkison | |
| 5,277,650 A | 1/1994 | Meyn | |
| 5,279,517 A | 1/1994 | Koops | |
| 5,290,187 A | 3/1994 | Meyn | |
| 5,299,975 A | 4/1994 | Meyn | |
| 5,299,976 A | 4/1994 | Meyn | |
| 5,318,428 A | 6/1994 | Meyn | |
| 5,326,311 A | 7/1994 | Persoon et al. | |
| 5,334,083 A | 8/1994 | van den Nieuwelaar et al. | |
| 5,336,127 A | 8/1994 | Hazenbroek | |
| 5,340,351 A | 8/1994 | Minderman et al. | |
| 5,340,355 A | 8/1994 | Meyn | |
| 5,342,237 A | 8/1994 | Kolkman | |
| 5,344,359 A | 9/1994 | Kolkman | |
| 5,344,360 A | 9/1994 | Hazenbroek | |
| 5,366,406 A | 11/1994 | Hobbel et al. | |
| 5,370,574 A | 12/1994 | Meyn | |
| 5,372,246 A | 12/1994 | van Aalst | |
| RE34,882 E | 3/1995 | Meyn | |
| 5,429,549 A | 7/1995 | Verrijp et al. | |
| 5,439,702 A | 8/1995 | French | |
| 5,453,045 A | 9/1995 | Hobbel et al. | |
| 5,462,477 A | 10/1995 | Ketels | |
| 5,470,194 A | 11/1995 | Zegers | |
| 5,487,700 A | 1/1996 | Dillard | |
| 5,505,657 A | 4/1996 | Janssen et al. | |
| 5,549,521 A | 8/1996 | van den Nieuwelaar et al. | |
| D37,388 S | 9/1996 | Dillard | |
| 5,569,067 A | 10/1996 | Meyn | |
| 5,569,069 A * | 10/1996 | Horst et al. | 452/169 |
| 5,595,066 A | 1/1997 | Zwanikken et al. | |
| 5,605,503 A | 2/1997 | Martin | |
| 5,643,072 A | 7/1997 | Lankhaar et al. | |
| 5,643,074 A | 7/1997 | Linnenbank | |
| 5,672,098 A | 9/1997 | Veraart | |
| 5,676,594 A | 10/1997 | Joosten | |
| 5,704,830 A | 1/1998 | Van Ochten | |
| 5,713,786 A | 2/1998 | Kikstra | |
| 5,713,787 A | 2/1998 | Schoenmakers et al. | |
| 5,741,176 A | 4/1998 | Lapp et al. | |
| 5,755,617 A | 5/1998 | van Harskamp et al. | |
| 5,759,095 A | 6/1998 | De Weerd | |
| 5,766,063 A | 6/1998 | Hazenbroek et al. | |
| 5,782,685 A | 7/1998 | Hazenbroek et al. | |
| 5,785,588 A | 7/1998 | Jacobs et al. | |
| 5,803,802 A | 9/1998 | Jansen | |
| 5,810,651 A | 9/1998 | De Heer et al. | |
| 5,810,653 A | 9/1998 | Van Craaikamp et al. | |
| 5,813,908 A | 9/1998 | Craaikamp | |
| 5,827,116 A | 10/1998 | Al et al. | |
| 5,833,527 A | 11/1998 | Hazenbroek et al. | |
| 5,865,672 A | 2/1999 | Hazenbroek | |
| 5,875,738 A | 3/1999 | Hazenbroek et al. | |
| 5,947,811 A | 9/1999 | Hazenbroek et al. | |
| 5,951,393 A | 9/1999 | Barendregt | |
| 5,954,574 A * | 9/1999 | Verrijp et al. | 452/169 |
| 5,975,029 A | 11/1999 | Morimoto et al. | |
| 5,976,004 A | 11/1999 | Hazenbroek | |
| 5,980,377 A | 11/1999 | Zwanikken et al. | |
| 6,007,416 A * | 12/1999 | Janssen et al. | 452/135 |
| 6,007,417 A | 12/1999 | Jones et al. | |
| 6,024,636 A | 2/2000 | Hazenbroek et al. | |
| 6,027,403 A | 2/2000 | Hazenbroek et al. | |
| 6,027,404 A | 2/2000 | Wols | |
| 6,029,795 A | 2/2000 | Janssen et al. | |

| | | | |
|---|---|---|---|
| 6,062,972 A | 5/2000 | Visser | |
| 6,095,914 A | 8/2000 | Cornelissen et al. | |
| 6,126,534 A | 10/2000 | Jacobs et al. | |
| 6,132,304 A | 10/2000 | Aarts et al. | |
| 6,142,863 A | 11/2000 | Janssen et al. | |
| 6,152,816 A | 11/2000 | van den Nieuwelaar et al. | |
| 6,176,772 B1 | 1/2001 | Hazenbroek et al. | |
| 6,179,702 B1 | 1/2001 | Hazenbroek | |
| 6,190,250 B1 | 2/2001 | Volk et al. | |
| 6,193,595 B1 | 2/2001 | Volk et al. | |
| 6,220,953 B1 | 4/2001 | Cornelissen et al. | |
| 6,231,436 B1 | 5/2001 | Bakker | |
| 6,254,471 B1 | 7/2001 | Meyn | |
| 6,254,472 B1 | 7/2001 | Meyn | |
| 6,277,020 B1 * | 8/2001 | Stephens | 452/135 |
| 6,277,021 B1 | 8/2001 | Meyn | |
| 6,299,524 B1 | 10/2001 | Janssen et al. | |
| 6,306,026 B1 | 10/2001 | Post | |
| 6,322,438 B1 * | 11/2001 | Barendregt et al. | 452/167 |
| 6,358,136 B1 | 3/2002 | Volk et al. | |
| 6,371,843 B1 | 4/2002 | Volk et al. | |
| 6,375,560 B1 | 4/2002 | Verrijp | |
| 6,383,069 B1 | 5/2002 | Volk et al. | |
| 6,398,636 B1 | 6/2002 | Jansen et al. | |
| 6,446,352 B2 | 9/2002 | Middelkoop et al. | |
| 6,478,668 B2 | 11/2002 | Visser et al. | |
| 6,599,179 B1 | 7/2003 | Hazenbroek et al. | |
| 6,612,919 B2 | 9/2003 | Janset et al. | |
| 6,656,032 B2 | 12/2003 | Hazenbroek et al. | |
| 6,726,556 B2 | 4/2004 | Gooren et al. | |
| 6,736,717 B1 | 5/2004 | Annema et al. | |
| 6,764,393 B1 | 7/2004 | Hazenbroek et al. | |
| 6,783,451 B2 | 8/2004 | Aandewiel et al. | |
| 6,811,478 B2 | 11/2004 | van den Nieuwelaar et al. | |
| 6,811,480 B2 | 11/2004 | Moriarty | |
| 6,811,802 B2 | 11/2004 | van Esbroeck et al. | |
| 6,830,508 B2 | 12/2004 | Hazenbroek et al. | |
| 6,837,782 B2 | 1/2005 | Hetterscheid et al. | |
| 6,899,613 B2 | 5/2005 | van den Nieuwelaar et al. | |
| 6,912,434 B2 | 6/2005 | van den Nieuwelaar et al. | |
| 6,986,707 B2 * | 1/2006 | Van Den Nieuwelaar et al. | 452/187 |
| 7,018,283 B2 | 3/2006 | Schmidt et al. | |
| 7,029,387 B2 | 4/2006 | van den Nieuwelaar et al. | |
| 7,059,954 B2 | 6/2006 | Annema et al. | |
| 7,063,611 B2 | 6/2006 | Nolten et al. | |
| 7,066,806 B2 | 6/2006 | de Heer et al. | |
| 7,070,493 B2 | 7/2006 | Hazenbroek et al. | |
| 7,115,030 B2 * | 10/2006 | van Hillo et al. | 452/167 |
| 7,125,330 B2 | 10/2006 | Beeksma et al. | |
| 7,128,937 B2 | 10/2006 | van den Nieuwelaar et al. | |
| 7,133,742 B2 | 11/2006 | Cruysen et al. | |
| 7,172,781 B2 | 2/2007 | Kish | |
| 7,232,365 B2 | 6/2007 | Annema et al. | |
| 7,232,366 B2 | 6/2007 | Van Den Nieuwelaar et al. | |
| 7,249,998 B2 | 7/2007 | van Esbroeck et al. | |
| 7,261,629 B2 | 8/2007 | Holleman | |
| 7,284,973 B2 | 10/2007 | van Esbroeck et al. | |
| 7,302,885 B2 | 12/2007 | Townsend | |
| 7,344,437 B2 * | 3/2008 | Van Den Nieuwelaar et al. | 452/187 |
| D565,941 S | 4/2008 | Peters et al. | |
| 7,357,707 B2 | 4/2008 | de Vos et al. | |
| 7,476,148 B2 | 1/2009 | McQuillan et al. | |
| 7,494,406 B2 | 2/2009 | Van Esbroeck et al. | |
| 7,530,888 B2 | 5/2009 | Annema et al. | |
| 7,572,176 B2 | 8/2009 | Petersen et al. | |
| 7,662,033 B1 | 2/2010 | Ritter et al. | |
| 7,662,034 B2 | 2/2010 | Van Hillo et al. | |
| 7,717,773 B2 | 5/2010 | Woodford et al. | |
| 7,740,527 B1 | 6/2010 | Harben | |
| 7,744,449 B2 | 6/2010 | van Esbroeck et al. | |
| 7,824,251 B2 | 11/2010 | van den Nieuwelaar et al. | |
| 2001/0023171 A1 | 9/2001 | Hazenbroek et al. | |
| 2002/0055328 A1 | 5/2002 | Schmidt et al. | |
| 2002/0058470 A1 | 5/2002 | Schmidt et al. | |
| 2002/0090905 A1 | 7/2002 | Moriarty | |
| 2002/0168930 A1 | 11/2002 | Jansen et al. | |
| 2003/0008606 A1 | 1/2003 | Hazenbroek et al. | |
| 2003/0084856 A1 | 5/2003 | Hazenbroek et al. | |
| 2003/0092372 A1 | 5/2003 | Aandewiel et al. | |
| 2004/0198209 A1 | 10/2004 | Hazenbroek et al. | |
| 2004/0235409 A1 | 11/2004 | Nolten et al. | |
| 2005/0037704 A1 | 2/2005 | Heer et al. | |
| 2005/0037705 A1 | 2/2005 | Beeksma et al. | |
| 2005/0048894 A1 | 3/2005 | van Hillo et al. | |
| 2005/0186897 A1 | 8/2005 | Holleman | |
| 2005/0221748 A1 | 10/2005 | Hillo et al. | |
| 2006/0099899 A1 | 5/2006 | Hazenbroek et al. | |
| 2006/0217855 A1 | 9/2006 | Gerrits | |
| 2007/0082595 A1 | 4/2007 | de Vos et al. | |
| 2007/0221071 A1 | 9/2007 | Kuijpers et al. | |
| 2007/0224306 A1 | 9/2007 | van Esbroeck et al. | |
| 2008/0017050 A1 | 1/2008 | van Esbroeck et al. | |
| 2008/0125025 A1 | 5/2008 | Van Den Nieuwelaar et al. | |
| 2008/0171506 A1 | 7/2008 | Nieuwelaar et al. | |
| 2009/0239457 A1 | 9/2009 | Jansen et al. | |
| 2009/0320761 A1 | 12/2009 | Grave et al. | |
| 2010/0022176 A1 | 1/2010 | Van De Nieuwelaar et al. | |
| 2010/0029186 A1 | 2/2010 | Janssen et al. | |
| 2010/0048114 A1 | 2/2010 | Van Den Nieuwelaar et al. | |
| 2010/0062699 A1 | 3/2010 | Sorensen et al. | |
| 2010/0075584 A1 | 3/2010 | Aandewiel et al. | |
| 2010/0081366 A1 | 4/2010 | De Vos et al. | |
| 2010/0120344 A1 | 5/2010 | Van Den Nieuwelaar et al. | |
| 2010/0151779 A1 | 6/2010 | Bakker | |
| 2010/0221991 A1 | 9/2010 | Hagendoorn | |

* cited by examiner

SPECIAL CUT POULTRY WING CUTTER

REFERENCE TO RELATED APPLICATION

Priority is hereby claimed to the filing date of U.S. provisional patent application Ser. No. 61/442,409 filed on 14 Feb. 2011.

TECHNICAL FIELD

This disclosure relates generally to poultry processing machinery and more specifically to systems and methods for removing the wings from the body of a poultry carcass as the carcass is moved along a processing path by a conveyor.

BACKGROUND

The processing of poultry such as chickens and turkeys has become highly automated. Birds generally are conveyed suspended by their legs from shackles of an overhead conveying systems along processing lines for evisceration, cut-up, and further processing. It is highly desirable to perform as many of the processing operations on the birds as possible while the birds are suspended from their shackles to minimize handling and ensure greater uniformity in the cutup and processing of the birds. Accordingly, the birds are conveyed into engagement with various processing devices while they move in series suspended from their shackles along a processing path. For example, the birds can be de-feathered, decapitated, opened, eviscerated, and cut apart while being advanced progressively through a poultry processing plant suspended from shackles of an overhead conveyor line. As a result, the labor required for processing poultry carcasses is significantly reduced while uniformity and adjustability in the sectioning of the poultry carcasses into various poultry parts is more predictable.

Chicken wings, commonly referred to as "buffalo wings" have become a popular takeout item for home consumption and as menu items in restaurants and fast food outlets. A demand has emerged for larger and meatier wings. This extra meat generally is taken from the breast and/or back portions of the birds from which their wings project. To ensure efficiency and proper cooking of the wings, it is important to retailers, restaurants, and others that all the wings to be cooked are of substantially the same weight. Larger wings do not cook as fast as smaller wings, and thus there is a possibility that the larger wings of a batch with smaller wings will be undercooked or that the smaller wings in a batch with larger wings will be overcooked. The result is poor quality product that may have to be discarded. Accordingly, it is important that precise, substantially similar amounts of breast and back meat be removed with the wings from the poultry carcass to ensure that each wing and its attached breast meat will be of a substantially equal size and weight. Furthermore, it may be more desirable to include as much breast meat as possible and in substantially the same amounts from wing to wing since breast meat generally is considered to be of higher quality than back meat. Wings with a piece of breast meat attached, depending upon their cut, may be referred to in the industry as "fast food style," or "silver dollar," or "new style" wings.

To ensure uniformity in the weight of chicken wings cut from birds in an automated processing plant, wing cutter machines have been developed. One example of a wing cutter is disclosed in U.S. Pat. No. 5,429,549 of Verrijp et al., and the contents of that patent are hereby incorporated by reference. In the wing cutter machine disclosed in the '549 patent, poultry carcasses suspended upside down from shackles are turned so that they encounter the wing cutter back-first; i.e. the backs face in the direction in which the carcasses are conveyed. As each carcass is, pulled by its shackles through the wing cutter, the wing on one side of the carcass is engaged by a first wing guide assembly, which tends to spread the wing away from the body of the carcass. This spreading of the wings dislocates and separates the joint between the wing and shoulder of the bird and pulls or stretches a quantity of meat from the back and/or breast of the bird. The bird is thereafter engaged at the separated shoulder joint by a first circular rotating blade, which cuts the wing and portions of back and/or breast meat from the body of the carcass. Subsequently, the wing on the opposite side of the bird is engaged by a second wing guide, which spreads this wing and dislocates or separates the shoulder in the same manner. The shoulder region is then engaged by a second circular rotating blade, downstream of the first, which cuts the wing and part of the pulled-away back and breast meat from the opposite side of the bird. Thus, wings with a piece of back meat and/or breast meat attached are cut from the moving birds to produce meatier chicken wings.

Other wing cutting devices are disclosed in, for example, U.S. Pat. Nos. 4,651,383 of van der Eerden and 5,569,069 of Horst et al., and the disclosures of these patents also are hereby incorporated by reference.

One shortcoming of prior wing cutters arises from the fact that birds encounter the wing cutter back-first or with their backs facing the direction of movements of the birds along the processing path. This can result in a more complex and, as in the '549 patent, a mechanized assembly for pulling the wings away from their carcasses. Furthermore, the amount of breast meat that is cut off with each wing can vary significantly since the rotating knives initially engage the shoulder joint region from the back of the bird rather from the front or breast side of the bird. As a result, it is more difficult and generally not possible with such wing cutters to ensure a consistent high quality "new style" or "silver dollar" wing, with a precisely sized piece of breast meat attached, which is demanded by consumers and therefore more valuable. There is thus a need for a wing cutter for an automated poultry processing line that addresses the shortcomings of the prior art. More specifically, there is a need for a wing cutter that produces wings with a highly consistent and predictable amount of breast meat attached to each wing. A wing cutter that produces high quality "new style" and "silver dollar" and "fast food" style wings is needed. It is to such a wing cutter and to a method of removing wings from poultry carcasses that the present invention is primarily directed.

SUMMARY

The disclosure of U.S. provisional patent application No. 61/442,409, to which priority is claimed above, is hereby incorporated by reference in its entirety.

Briefly described, a special cut wing cutter is disclosed for removing wings from the bodies of poultry carcasses as the carcasses are conveyed along a processing path suspended from shackles. The wing cutter has an upstream end where the carcasses enter and a downstream end where the carcasses, sans wings, exit the wing cutter. Unlike prior art wing cutters, the wing cutter is configured so that poultry carcasses encounter the wing cutter breast first rather than the traditional back first orientation. Alignment rails center and position each carcass as it begins to move into the wing cutter and an inclined elevation plate raises the neck of carcass up and bends or arches the torso of the bird slightly. The wings of the carcass then move into diverging wing slots on either side of the processing path where the wings are captured adjacent the shoulder joints. The wing slots may be defined between corresponding pairs of guide rails, which are angled outwardly from their upstream ends toward their downstream ends.

As each carcass is pulled by its shackles further through the wing cutter, the outwardly diverging wing slots between the guide rails progressively pull the wings away from the body of the carcass until the shoulder joints become dislocated and separated. In the process, a portion of the breast of each bird is pulled or stretched outwardly with each wing. Since the bird progresses breast-first through the wing cutter, the portions of breast meat that are pulled out face forward in the direction of movement of the carcass. Rotating cutting blades on each side of the carcass then engage the bird in the region of the now separated shoulder to cut the wings from the carcass. More specifically, the cutting blades first engage and begin cutting the forwardly facing portions of the breast meat that have been pulled or stretched outwardly with the wings. As the bird progresses further, the blades slice through the meat, skin, and tendons between the separated shoulder joint of the bird to cut the wings with a piece of breast meat attached away from the carcass. The severed wings fall downwardly to be collected while the now wingless carcass continues to be conveyed along the processing path for additional processing.

Since the birds encounter and move through the wing cutter breast first rather than back first, the cuts that sever the wings begin at the breast meat and progresses through the shoulder joint to the back of each bird. Thus, through proper adjustment of the positions and angles of the rotating blades, wing slots, and other structures, a highly consistent and predictable amount of breast meat can be cut away with each wing. Exceedingly high quality and consistently sized new style, silver dollar style, and fast food style wings can therefore be produced reliably and repeatably. These and other features, aspects, and advantages of the wing cutter and method disclosed herein will become more apparent upon review of the detailed description presented below taken in conjunction with the accompanying drawing figures, which are briefly described as follows.

DETAILED DESCRIPTION

Figure 1:
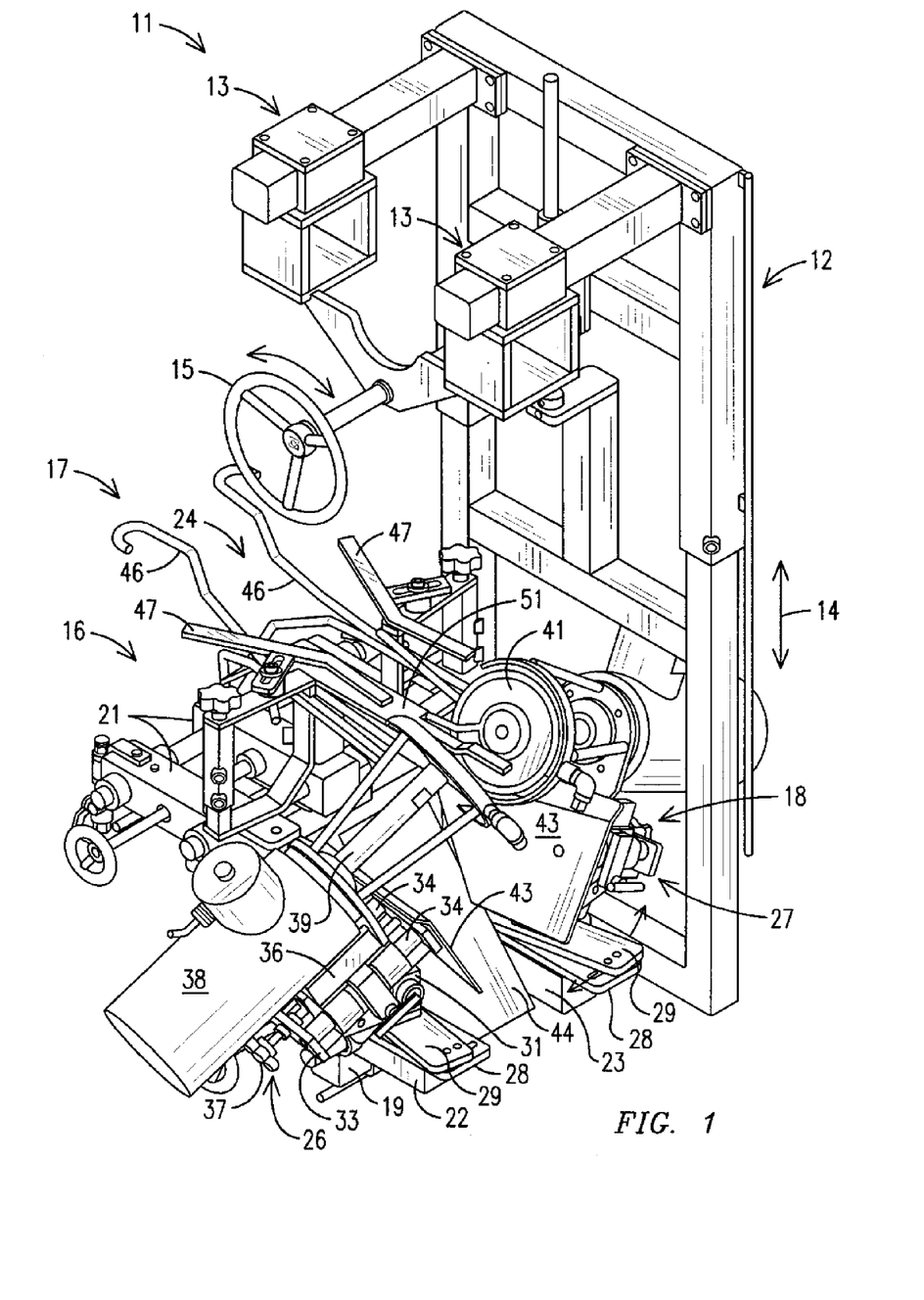
FIG. 1 is a perspective view of a wing cutter that embodies principles of the invention in one preferred embodiment and generally is seen from the downstream end of the wing cutter.

Reference will now be made in more detail to the drawing figures, wherein like reference numerals indicate like parts throughout the several views. FIG. 1 illustrates a wing cutter assembly 11 that embodies principles of the invention in one preferred form. The assembly 11 includes a frame 12 configured to support the components of the wing cutter, generally indicated at 16. Mounts 13 are attached to the frame 12 for mounting the wing cutter assembly to the frame of a poultry processing line so that the wing cutter 16 is positioned in the processing path of poultry carcasses being conveyed along the processing line. The frame 12 is adjustable up and down as indicated by arrow 14 to adjust the height of the wing cutter 16 relative to the processing path along which poultry carcasses are conveyed. Adjustment is accomplished in this embodiment by rotating hand wheel 15 to move the wing cutter up or down as needed, although other adjustment mechanisms my be substituted with equivalent results. Support beams 21, 22, 23 are mounted on the frame 12 and are configured to receive and support the elements of the wing cutter 16. Preferably, but not necessarily, the support beams are adjustable in spacing to adapt the wing cutter 16 to various size poultry carcasses, as is known in the art.

The wing cutter 16 has an upstream end, generally indicated at 17, and a downstream end generally indicated at 18. Moving poultry carcasses encounter the wing cutter 16 at its upstream end 17 and the carcasses exit the wing cutter at its downstream end 18 with their wings having been removed as detailed below. A guide rail assembly, generally indicated at 24, is disposed at the upstream end of the wing cutter 16 for positioning and guiding each carcass through the wing cutter. Cutter assemblies 26 and 27, which generally are mirror images of each other, are positioned at the downstream end of the wing cutter 16 on either side of the processing path of poultry carcasses through the wing cutter. Each cutter assembly includes an adjustment plate 29 that is adjustably mounted on a mounting plate 28 fixed to a respective support beam 22, 23. The adjustment plates 29 can be rotated or pivoted about a generally vertical axis as indicated by the arrows adjacent the right adjustment plate in FIG. 1 and can be fixed in a desired position.

A collar 31 is secured to each adjustment plate 29 and, in this embodiment, is formed with a generally U-shaped cross section with spaced upwardly projecting legs. A pivot block 32 (FIG. 4) is disposed between the legs of the collar 31 and can be rotated about a generally horizontal axis of a locking bolt that extends through the legs of the collar and through the pivot block. A saddle 33 is fixed to the pivot block 32 and includes spaced upstanding end plates between which guide rails 34 extend. A motor mount block 36 is mounted on the guide rails 34 by means of a bushing assembly that is adjustably slidable by means of a hand wheel 37 along the guide rails and can be locked in a desired position therealong. An electric motor 38 is secured to the motor mount block 36 and has a projecting rotary shaft 39, to the end of which a disc-shaped cutting blade 41 is attached. Activation of the electric motors 38 causes their respective cutting blades to rotate at a relatively high rate to slice through skin, meat, and tendons of a poultry carcass as detailed below. With the just described arrangement, it will be seen that the adjustment plates 29, the saddle 33, and the motor mounting block can all be adjusted as needed to position and orient the cutting blades in virtually any configuration. Thus, precise adjustments are possible to cut away wings from poultry carcasses predictably and repeatedly regardless of the size and shape of carcasses being processed.

Figure 2:
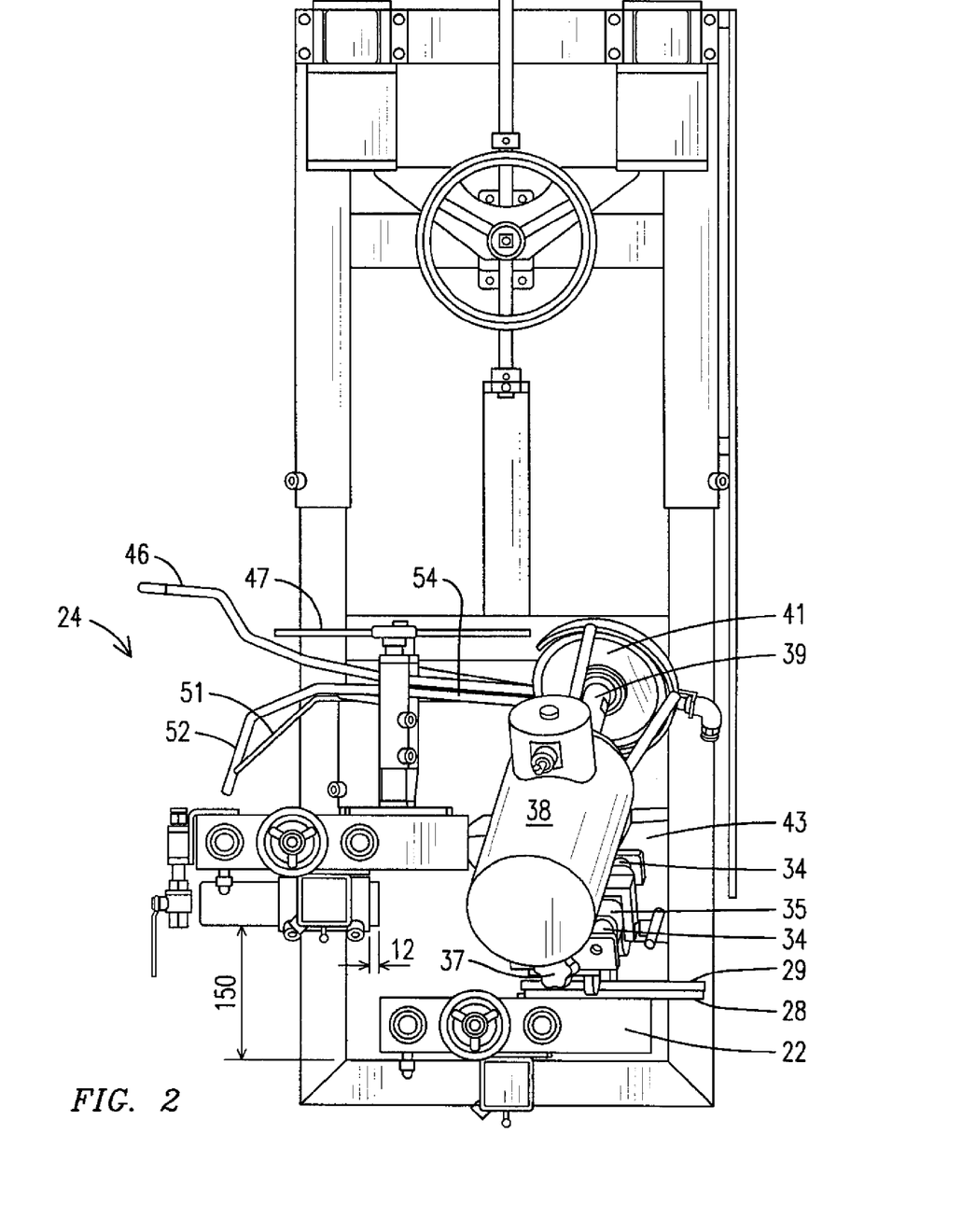
FIG. 2 is a side elevational view of the wing cutter of FIG. 1
Figure 3:
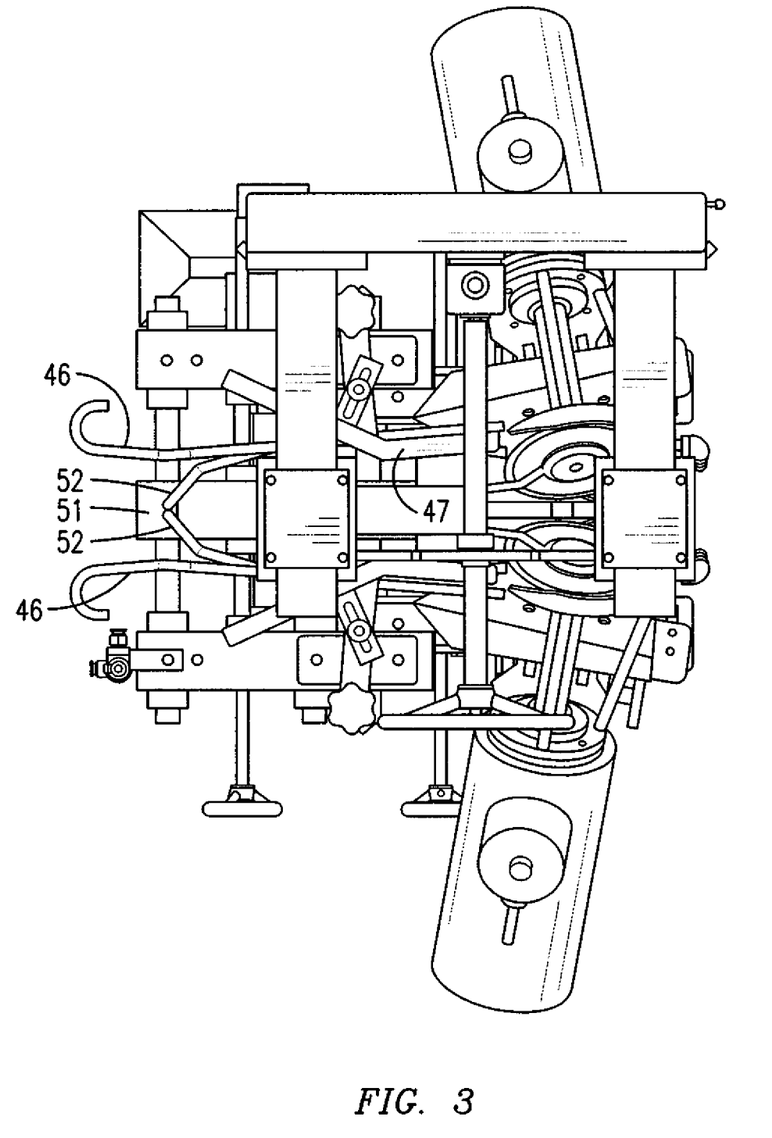
FIG. 3 is a top plan view of the wing cutter of FIG. 1

With particular reference to FIGS. 2 and 3, the guide rail assembly 24 at the upstream end of the wing cutter includes a pair of upper alignment rails 46 that project upwardly and in an upstream direction to curved ends. A pair of spaced restraining plates 47 is disposed just downstream of and below the ends of the alignment rails 46. The restraining plates 47 have first and second legs that are angled with respect to one another and the inside edges of the restraining plates extend first inwardly toward one another and then slightly outwardly away from each other as best illustrated in FIG. 3. The restraining plates are adjustably mounted by means of a slotted flange and bolt so that they can easily be adjusted with respect to one another to accommodate various sized and shaped poultry carcasses as necessary. The restraining plates engage the bodies of carcasses on either side to stabilize the bodies during processing by the wing cutter. A pair of lower guide rails 52 is disposed below the upper guide rails 46. As best seen in FIG. 3, the lower guide rails 52 are configured to extend initially upwardly toward the upper guide rails. Further, the ends of the lower guide rails 52 at the upstream end of the wing cutter are closely adjacent one another and the lower guide rails diverge away from each other as well as toward the upper guide rails 46 in the downstream direction. The upper and lower guide rails thus form a mouth of the wing cutter for receiving and aligning poultry carcasses as they are conveyed into the wing cutter.

An elevation plate 51 is disposed just beneath the lower guide rails 52 at the upstream end of the wing cutter and extends generally along the processing path. The elevation plate 51 angles upwardly from a position adjacent the ends of the lower guide rails 52 as best illustrated in FIG. 2. The neck portions of poultry carcasses entering the wing cuter engage the elevation plate 51 as they are being aligned by the guide rails to raise the neck portion up and back and thereby arch the back of the bird slightly as it moves progressively into the wing cutter.

At the mid-portion of the wing cutter, the upper and lower guide rails merge toward one another and then extend generally parallel to each other toward the downstream end of the wing cutter. The rails thus define a wing slot 54 (FIG. 2) between themselves. Further, the rails and the wing slots between them diverge slightly away from each other and away from the processing path in the downstream direction. In the illustrated embodiment, the angle of divergence of the guide rails and wing slots corresponds substantially with the angle at which the second legs of the restraining plates above are disposed with respect to each other, although this is not a requirement or limitation of the invention. The downstream ends of the guide rails terminate at positions substantially aligned with the upstream knife edges of the cutting blades 41. As shown in FIG. 1, however, the elevation plate has a downstream end that is disposed between the cutting blades and is formed to define a three pronged fork configuration with the center prong bent upwardly and extending between the blades and the side prongs angled outwardly and extending to the outsides of the cutting blades. The forked end thus defines slots between which the cutting blades are disposed and rotate. The upper and lower guide rails, the elevation plate, and the restraining plates are all adjustable to accommodate birds of different sizes and configuration and/or to produce different cuts of meat, as discussed in more detail below.

Figure 4:
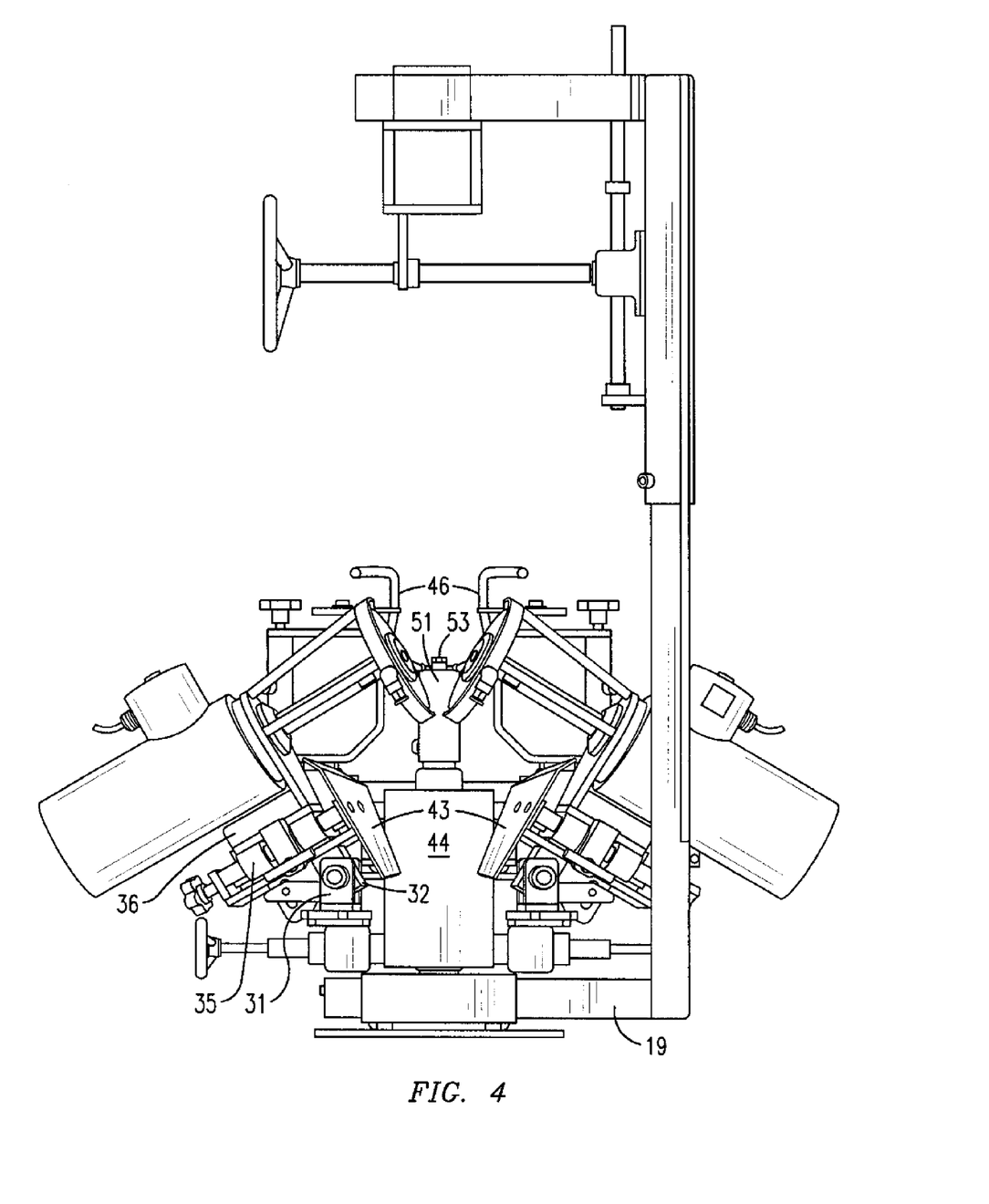
FIG. 4 is a front elevational view of the wing cutter of FIG. 1

FIG. 4 is an end view of the wing cutter as seen from the downstream end thereof. In this view, the motor mount block 36, adjustable carriage 35, mounting collar 31, pivot block 32, and adjustment plates 29 are perhaps better illustrated. As mentioned, these components allow virtually unlimited adjustability of the positions and orientations of the cutting blades 41 with respect to the processing path of birds through the wing cutter. Accordingly, the blade positions and orientation can be fine tuned to produce wings with a desired and consistent size piece of breast meat attached at the shoulder or to produce various commercially desirable cuts of wings as the case may be. Side deflector plates 43 are attached to the interior ends of the saddles 33 and are located substantially below the cutting blades 41. A central deflector plate 44 is disposed upstream of the side deflector plates 43 and angles downwardly and in the downstream direction beneath the side plates. Together, the side deflector plates and central deflector plate funnel and direct the wings that are severed from poultry carcasses by the cutting blades 41 inwardly and downwardly so that they may be collected in a bin or on a conveyor, for example, to be transported for additional processing.

Figure 5:
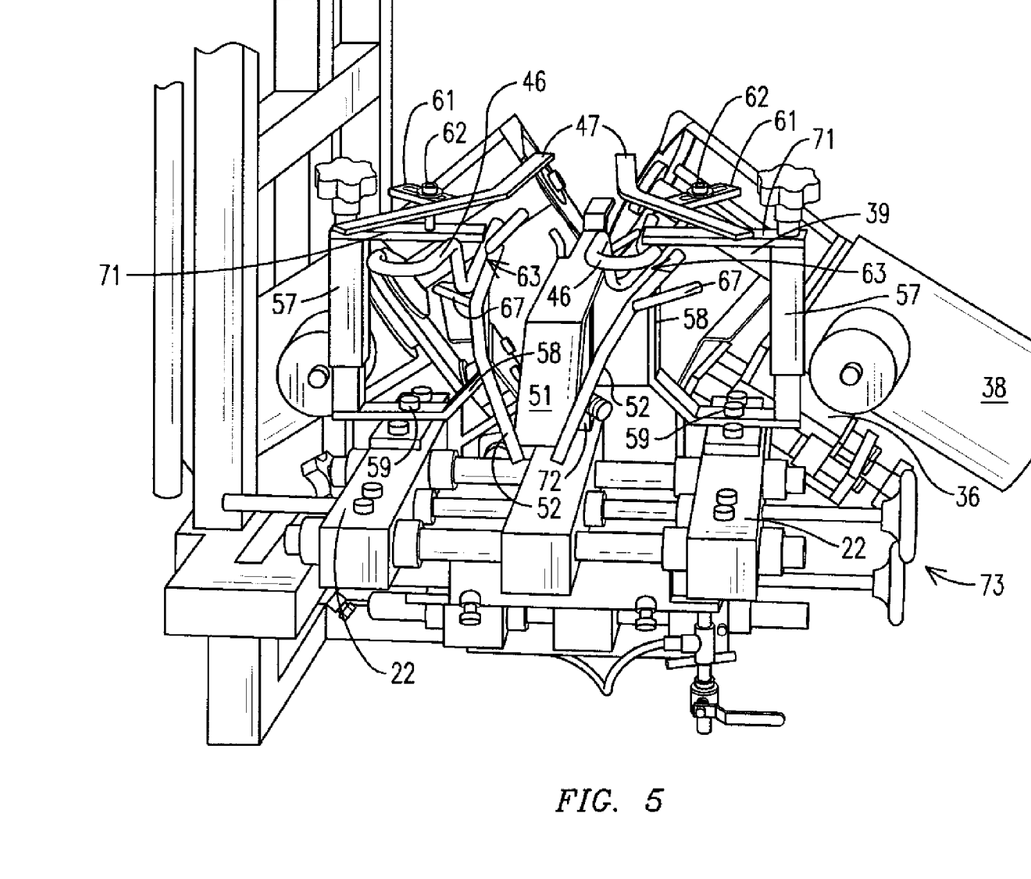
FIG. 5 is a perspective view of the wing cutter of FIG. 1 seen from the upstream end thereof.

FIG. 5 shows the wing cutter from the upstream end thereof and illustrates perhaps better the adjustment mechanisms of the illustrated embodiment for adjusting the positions and orientations of the various elements of the wing cutter. More specifically, the restraining plates 47 and the upper guide rails 46 are secured to lateral extensions 71 that are secured to the upper ends of telescopically adjustable posts 57. Adjustment of the posts 57 positions the restraining plates and the upper guide rails at a desired vertical position and also increases or decreases the size of the wing slots 63 between the upper and lower guide rails. The adjustable posts, in turn, are secured to support beams 22 with adjustment bolts 59, which allow the adjustable posts and thus the upper and lower guide rails 46 and 52 and the restraining plates 47 to be pivoted about the vertical axes of the adjustment bolts 59. This permits the angles between these components to be adjusted as needed to accommodate various sizes or configurations of poultry being processed. The elevation plate 51 is also mounted on a telescopically adjustable post 72 so that its vertical position also can be adjusted as needed to position carcasses properly for encountering the cutting blades 41. Finally, the spacing between the support beams 22, and thus the horizontal distance between the various components secured thereto, is adjustable by means of one or more hand wheels 73. It will thus be seen that virtually all of the components of the wing cutter are easily adjustable in a variety of directions and about a variety of axes to configure the wing cutter to accommodate virtually and size and configuration of poultry carcasses to be processed. These adjustments also allow the wing cutter to be finely adjusted to produce different cuts of wings such as for example, new style, silver dollar, and fast food style wings.

Figure 6A:
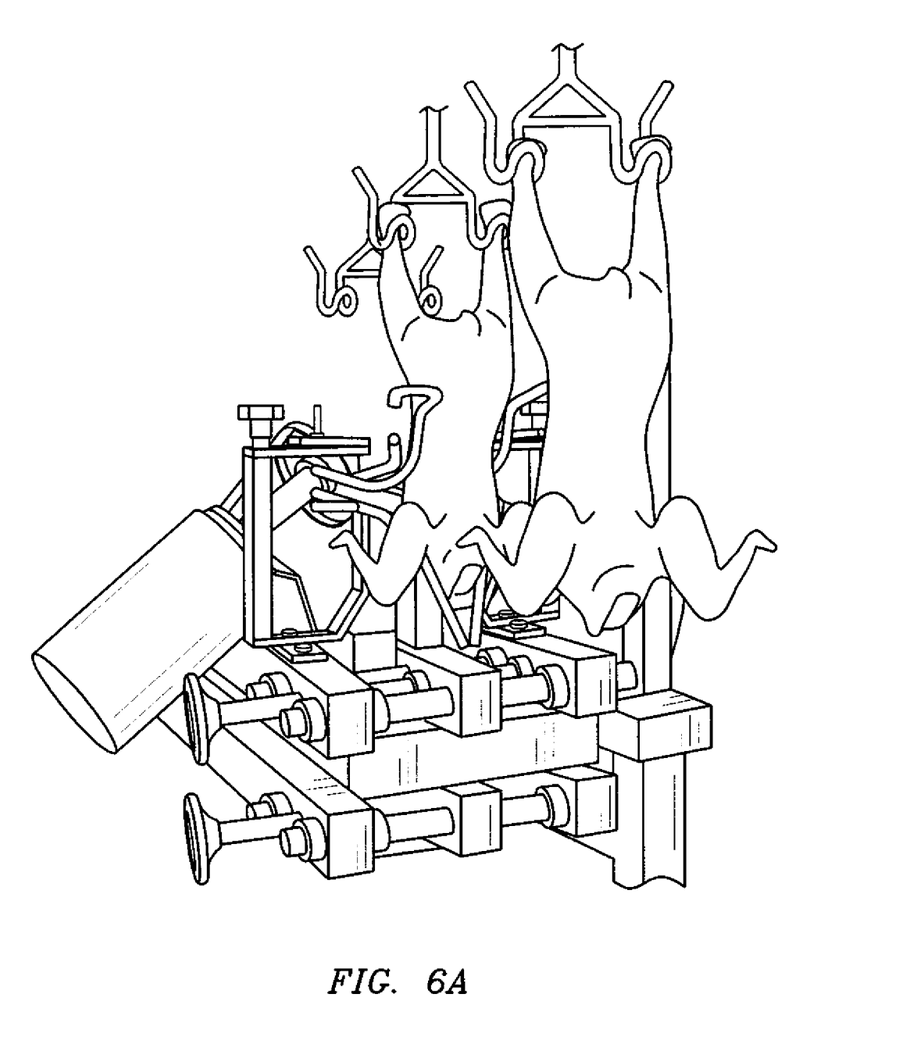
FIGS. 6a-6e show the progress of a poultry carcass through the wing cutter of FIG. 1 and illustrate various aspects of the method carried out by the wing cutter to remove the wings from the body of the poultry carcass.

Having described the various components of the wing cutter, FIGS. 6a-6e illustrate sequentially the progression of a poultry carcass through the wing cutter for removing the wings therefrom. The poultry carcass is seen to be suspended upside down by its legs from shackles that are conveyed along the processing path by an overhead conveyor system. The bird has previously been decapitated, eviscerated, and the like and the bird's neck hangs downwardly with its wings extending outwardly to the sides of its body. Prior to encountering the wing cutter, the shackles are turned in a know manner to orient the carcass with its breast facing the wing cutter so that it encounters the wing cutter breast first. As mentioned, this differs uniquely from prior wing cutters where carcasses are presented to the wing cutter back first as described above. As seen in FIG. 6a, as each carcass enters the mouth of the wing cutter, its body becomes captured between the upper guide rails to position and stabilize the carcass. At the same time, the lower guide rails engage the carcass in the shoulder regions on either side of the neck while the neck is engaged by the elevation plate. The diverging section of the lower guide rails begins to urge the wings of the bird outwardly away from the carcass as the bird is conveyed further into the mouth of the wing cutter.

Figures 6B, 6C:
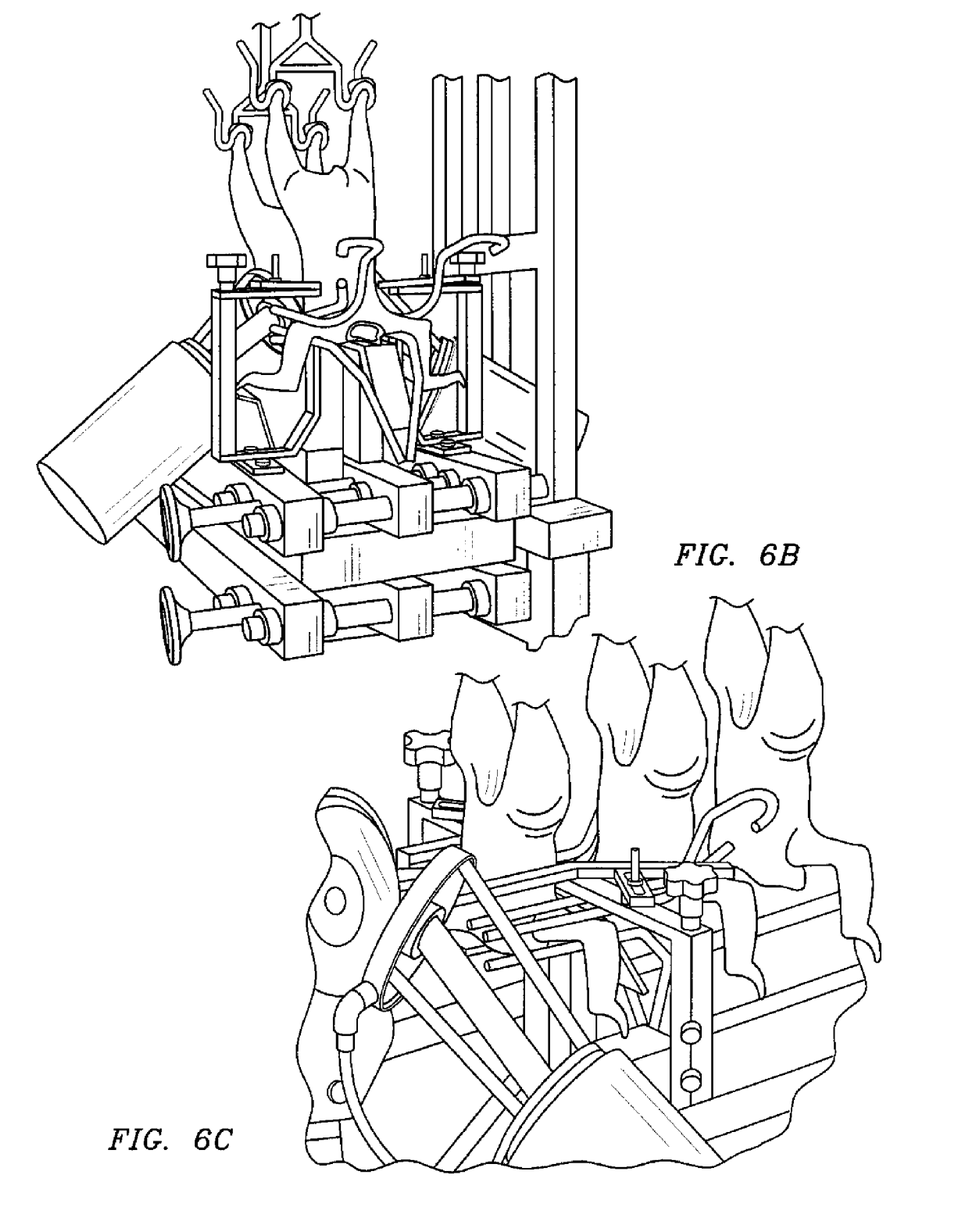

In FIG. 6b, the carcass has progressed so that the neck rests on the horizontal top portion of the elevation plate, which arches the back of the carcass slightly as shown. At the same time, the wings have moved into the wing slots between the upper and lower guide rails and are captured within the slots between the shoulder and the elbow joints. In FIG. 6c, the bird has been pulled by its shackles further through the wing cutter toward the cutting blades. In the process, the diverging upper and lower rails between which the wings are captured have progressively pulled the wings outwardly from the body thereby dislocating and separating the shoulder joints of the bird. As this occurs, the body of the bird is held and retained in place by the spaced stabilizing plates. This prevents the carcass from being pulled out of central alignment by the pulling force exerted on the wings and the dislocation of the shoulder joints. As the wings are pulled outwardly from the body and the shoulder joints dislocated, some of the breast meat of the carcass adjacent the shoulder joint is pulled or stretched outwardly with the wings. It is this portion of the breast meat that will first encounter the cutting blades as the wings are sliced off of the carcass depending upon the cut of wing being produced.

Figure 6D:
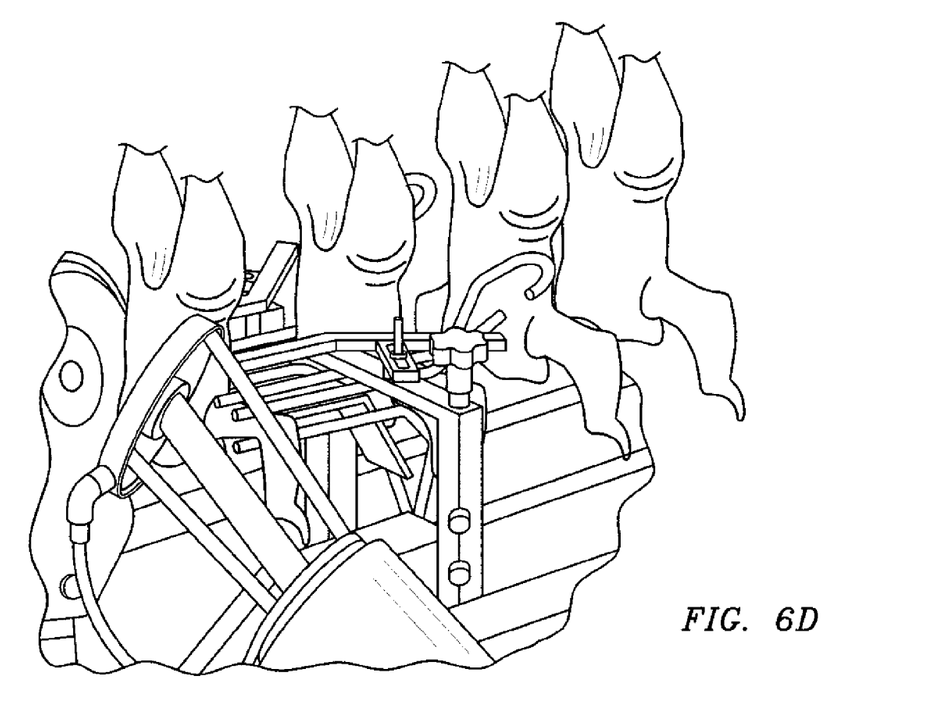

In FIG. 6d the carcass has been pulled a bit further through the wing cutter. At this location, the shoulder joints have been fully dislocated and the stretched out portion of breast meat is exposed to the cutting blades. FIG. 6d shows this portion of the breast meat just encountering the rotating cutting blades. As discussed above, since the portion of the breast meat that is stretched outwardly with the wings is substantially consistent from carcass to carcass, the initial cut of the blades begins to slice of a consistently sized piece of breast meat from each carcass that is processed. This differs from prior back first wing cutters where the initial cut is made from the back of the carcass and the last thing to be cut is the breast meat. In such wing cutters, the size of the piece of breast meat cut away to remain with the severed wings is generally not often consistent from carcass to carcass.

Figure 6E:
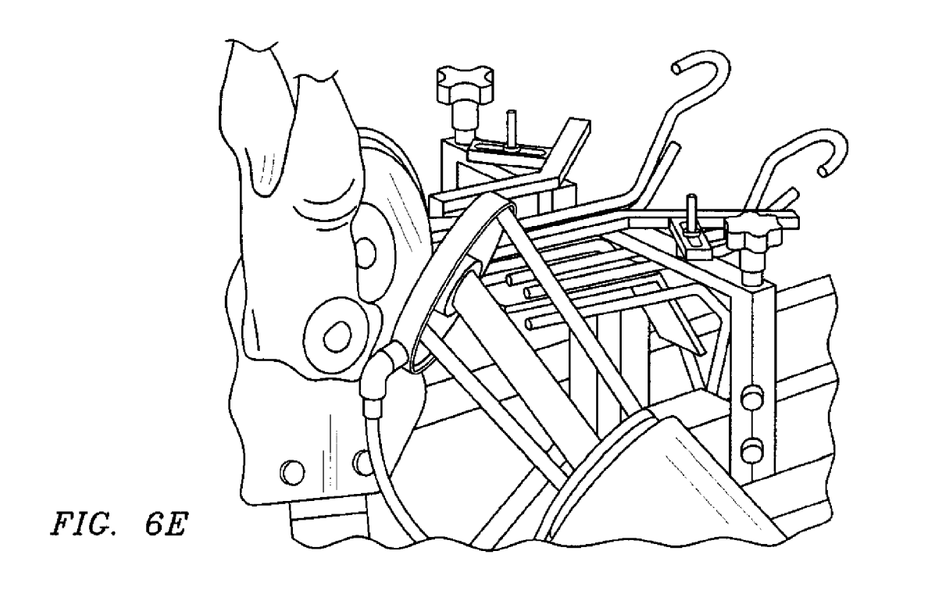

Finally, in FIG. 6e, the carcass is seen moving beyond the cutting blades as it leaves the wing cutter. As shown, the wings have been cleanly severed from the carcass between the dislocated shoulder joints. Further, a piece of breast meat, which is substantially similar in size from carcass to carcass, can be seen to have been sliced from the breast of the carcass to remain with the severed wings. This produces higher value "new style" or "silver dollar" wings that are each of similar weight with a consistently sized piece of breast meat attached. The severed wings, not visible in FIG. 6e, have fallen downwardly to be directed by the side and bottom deflector plates into a collector bin, onto a conveyor, or otherwise collected to be transported to a remote location for further processing.

The invention has been described above within the context of a preferred embodiment and a preferred methodology. It will be clear to those of skill in the art, however, that an array of additions, deletions, and modifications, both subtle and gross, may well be made to the illustrated and preferred embodiments without departing from the scope of the invention as delineated only by the claims. Such additions, deletions, and modifications are considered to be and should be construed to be within the scope of the claims.

What is claimed is:

1. An apparatus for removing the wings from poultry carcasses moving in series suspended by their legs from an overhead conveyor with their breasts facing substantially in the direction of movement, the apparatus having an upstream end for receiving carcasses, a downstream end, and a processing path defined between the upstream and downstream ends, the apparatus comprising:

a support frame;
   a mouth at the upstream end of the apparatus configured to receive and align the carcasses for processing;
   a pair of wing slots defined downstream of the mouth and configured to capture the wings of carcasses, the wing slots diverging outwardly away from the processing path in the downstream direction to pull captured wings away from their carcasses as the carcasses progress along the processing path and thereby dislocate and separate the shoulder joints of the carcasses and pull a portion of breast meat outwardly from the breasts of the carcass;
   a pair of cutting blades downstream of the wing slots on either side of the processing path, the cutting blades being positioned and oriented to slice off a piece of the breast meat and to slice off the wings at the dislocated shoulder joints to produce wings with a piece of breast meat attached; and
   surfaces below the processing path for directing the severed wings to a collection location.

2. The apparatus of claim 1 and further comprising a surface configured to elevate the neck and arch the back of the carcasses as they move along the processing path toward the cutting blades.

3. The apparatus of claim 2 and wherein the surface comprises an elevation plate having an upwardly extending ramped portion for progressively raising the neck and arching the back of carcasses and a substantially horizontal portion for maintaining the elevated and arched configurations of the carcasses as they moves downstream toward the cutting blades.

4. The apparatus of claim 1 and wherein the mouth is defined by upper guide rails and lower guide rails.

5. The apparatus of claim 4 and wherein the upper guide rails are spaced apart and configured to engage and stabilize the carcasses as they enter the apparatus.

6. The apparatus of claim 5 and wherein the lower guide rails are spaced apart and configured to engage the carcasses on either side of the neck as the carcasses enter the apparatus.

7. The apparatus of claim 6 and wherein the upper guide rails and lower guide rails converge toward one another in the downstream direction.

8. The apparatus of claim 7 and wherein the upper guide rails and lower guide rails extend substantially parallel with one another downstream of the mouth to define the wing slot between them.

9. The apparatus of claim 1 and further comprising restraining structures configured to restrain the bodies of carcasses as the captured wings are pulled away from the bodies by the wing slots.

10. The apparatus of claim 9 and wherein the restraining structures comprise restraining plates located on either side of the processing path above the wing slots.

11. A method of removing wings from the body of a poultry carcass with the wings having a piece of breast meat remaining with the removed wings, the method comprising the steps of:

(a) moving the carcass along a processing path with the breast of the carcass facing in the direction of movement;
   (b) stabilizing the carcass;
   (c) progressively pulling the wings in a direction away from the body of the carcass as the carcass moves along the processing path;
   (d) progressively stretching portions of the breast meat of the carcass outwardly in response to step (c);
   (e) engaging the carcass with cutting blades in the regions of the outwardly stretched portions of the breast meat;
   (f) advancing the cutting blade through the carcass at a selected location between the wings and the body of the carcass to sever the wings from the body with a piece of breast meat attached to the severed wings; and
   (g) collecting the severed wings.

12. The method of claim 11 and wherein step (b) comprises engaging the carcass on either side with a stabilizer.

13. The method of claim 12 and wherein the stabilizer comprises first and second stabilizer plates disposed on opposing sides of the processing path.

14. The method of claim 11 and wherein step (c) comprises capturing the wings within respective wing slots that diverge outwardly from the processing path in the direction of movement of the carcass.

15. The method of claim 14 and wherein the wing slots are defined between upper and lower guide rails.

16. The method of claim 11 and wherein step (c) further comprises dislocating and separating the shoulder joints of the carcass as a result of pulling the wings away from the body of the carcass.

17. The method of claim 16 and where in step (f) the selected location is between the separated shoulder joints.

18. The method of claim 11 and where in step (e) the cutting blades are stationary cutting blades on either side of the processing path.

19. The method of claim 18 and wherein the cutting blades are rotating cutting blades.

20. The method of claim 19 and wherein step (f) comprises moving the carcass along the processing path past the cutting blades to advance the blades through the carcass and sever the wings from the body of the carcass.

21. A wing cutter for severing wings from bodies of poultry carcasses as the poultry carcasses are moved along a processing path extending through the wing cutter with the breasts of the poultry carcasses facing in the direction of movement, the wing cutter having an upstream end and a downstream end and comprising:
   a mouth at the upstream end of the wing cutter configured to receive poultry carcasses moving along the processing path and position the poultry carcasses for movement through the wing cutter;
   wing slots downstream of the mouth on either side of the processing path, the wing slots being sized, positioned, and configured to capture the wings of carcasses and to pull the wings progressively away from the bodies of the carcasses as the carcasses move along the processing path; and
   cutting blades on either side of the processing path at the downstream end of the wing cutter, the cutting blades being positioned and oriented to cut the wings from poultry carcasses as the carcasses are moved past the cutting blades.

22. A wing cutter as claimed in claim 21 and further comprising an elevation plate on the wing cutter extending along the processing path, the elevation plate being configured and positioned to engage the lower portions of poultry carcasses as the carcasses are moved toward the cutting blades and to elevate the lower portions and thereby arch the backs of the poultry carcasses as they advance toward the cutting blades.

23. A wing cutter as claimed in claim 21 and wherein the mouth is defined by upper and lower guide rails.

24. A wing cutter as claimed in claim 21 and wherein the wing slots are defined between upper and lower guide rails.

25. A wing cutter as claimed in claim 21 and wherein the wing slots diverge outwardly from the processing path in the downstream direction of the wing cutter.

26. A wing cutter as claimed in claim 25 and wherein the divergence of the wing slots is sufficient to dislocate and separate the shoulder joints of the carcasses.

27. A wing cutter as claimed in claim 26 and wherein the divergence of the wing slots is sufficient to pull a piece of breast meat outwardly away from the bodies of carcasses as a result of pulling the wings.

28. A wing cutter as claimed in claim 27 and wherein the cutting blades are positioned and oriented to engage the carcasses in the regions of the pulled-out breast meat so that the severed wings each have a piece of breast meat attached thereto.

29. A wing cutter as claimed in claim 21 and wherein the severed wings are new style wings.

30. A wing cutter as claimed in claim 21 and wherein the severed wings are silver dollar style wings.

31. A wing cutter as claimed in claim 21 and wherein the severed wings are fast food style wings.

* * * * *